Figure 1:
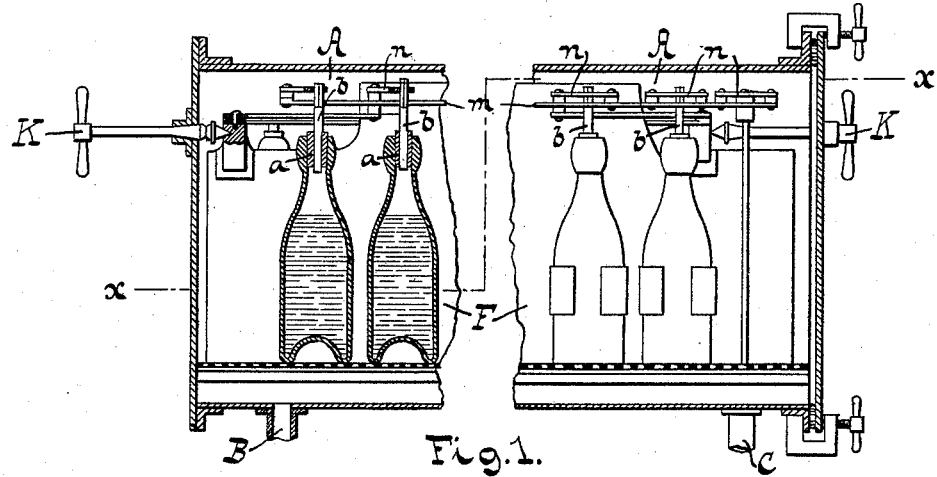

(No Model.)

G. POPP & J. H. BECKER.
PROCESS OF STERILIZING MILK, &c.

No. 524,649. Patented Aug. 14, 1894.

WITNESSES:
Klas H. Rimstedt
J. J. Malle

INVENTORS:
Georg Popp
Johann Heinrich Becker,
BY
A. Faber du Faur,
ATTORNEY

UNITED STATES PATENT OFFICE.

GEORG POPP AND JOHANN HEINRICH BECKER, OF FRANKFORT-ON-THE-MAIN, GERMANY.

PROCESS OF STERILIZING MILK, &c.

SPECIFICATION forming part of Letters Patent No. 524,649, dated August 14, 1894.

Application filed April 11, 1893. Serial No. 469,990. (No specimens.)

*To all whom it may concern:*

Be it known that we, GEORG POPP and JOHANN HEINRICH BECKER, both subjects of the Emperor of Germany, residents at Frankfort-on-the-Main, Prussia, Germany, have invented new and useful Improvements in Processes for the Sterilization of Milk, &c., of which the following is a specification.

Our invention has reference to a method of sterilizing milk and other liquids;—it having for its primary objects to obtain a complete sterilization of the liquid and to facilitate the operations.

It is well known that to obtain a complete and thorough sterilization of milk and other liquids, it is not sufficient merely to raise and maintain the liquid for a definite time at a temperature slightly in excess of 100° centigrade; but, that it is essential to cool the liquid after this heating,—preferably rapidly, and then again subject the same to the heat. This intermediate cooling of the liquid serves to so develop such bacteria and spores which may be in the so-called latent condition, that they are destroyed in the subsequent reheating of the liquid. Heretofore this fractional sterilizing has been carried out with bottles, or other receptacles provided with stoppers made of wadding, by placing the receptacles repeatedly in the sterilizing chamber. The air which may enter the receptacles upon the condensation of the steam is purified by the wadding. While this manner of carrying out the fractional sterilization answers for scientific and experimental purposes, it is not well adapted for sterilization on a large scale for the market, since the wadding closures do not permit transportation of the receptacles to greater distances witout special treatment or appliances, and because the closures in time breed and become filled with micro-organisms. It was therefore necessary heretofore for commercial purposes, either to heat the liquid but once, or, to enable a repeated heating with free exchange of gases, it was necessary to open the several receptacles, which had been heated in the apparatus, separately and externally to the same, and then place them again into the apparatus and reheat and close them in the usual manner. The cooling of the receptacles and contents external to the sterilizing apparatus has heretofore been usually accomplished by ordinary air cooling or by placing the same in warm water, which is gradually cooled. The opening of the receptacles external to the sterilizing apparatus after they have been already heated and closed inside of the apparatus has the disadvantage that in view of the vacuum formed in the receptacles, air is drawn into the same and with it germs;—and besides this the process is very costly in view of the fact that each receptacle must be separately manipulated.

Our process consists essentially in placing the receptacles while open into the heating chamber where they are subjected to the action of steam or other heating agent at the usual temperature and for the proper period of time;—then they are closed air-tight while in the steam chamber and after closure they are cooled; in practice preferably by removing the same while closed from the chamber and cooling in any well known manner. After proper cooling, and after the proper period of rest, the receptacles are again placed into the heating chamber, and opened after the steam or other heating agent has been turned on and all the air expelled from the chamber. After this second sterilization the receptacles are closed while in the chamber, and, after the steam or other heating agent has been turned off, they are removed.

Figure 2:
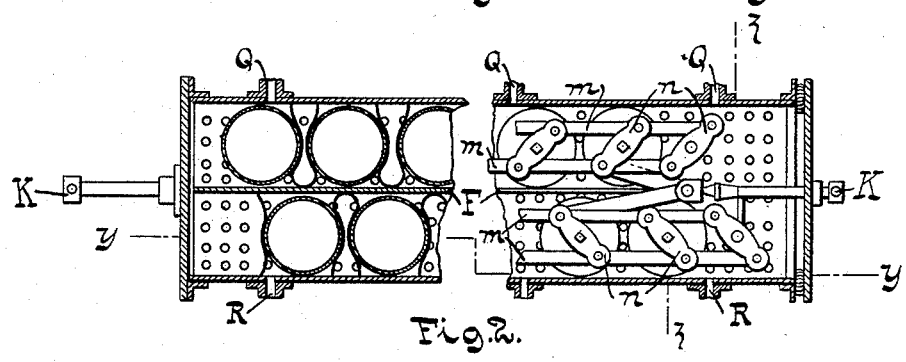
Figure 3:
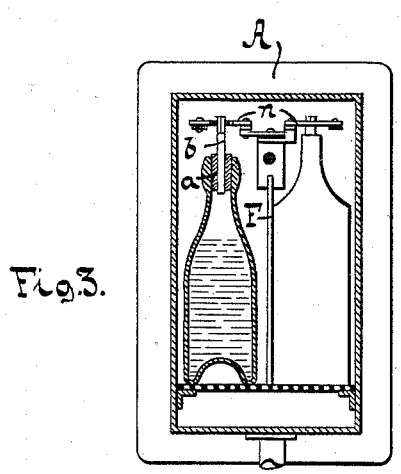
Figure 4:
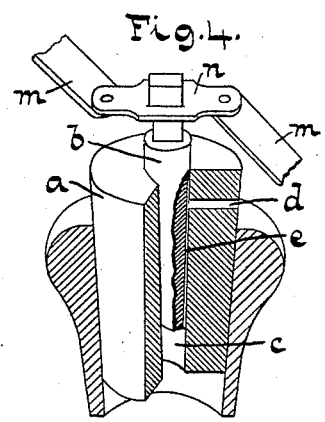

In the accompanying drawings where we have illustrated an apparatus especially adapted for carrying out our process, Figure 1 represents a vertical section in the plane *y y* Fig. 2. Fig. 2 is a horizontal section in the plane *x x* Fig. 1. Fig. 3 is a transverse section in the plane *z z*, Fig. 2, and Fig. 4 is a sectional perspective view illustrating a construction for the bottle closure.

Similar letters of reference indicate corresponding parts throughout the several views of the drawings.

In the drawings the letter A designates the heating chamber, to which in this instance steam is conducted through pipe B, while the water of condensation is led away through pipe C.

F is a suitable removable rack constructed to rigidly hold the bottles or other receptacles.

m n are two sets of parallel movements connected with the closures and adapted to turn the same, when either of the push bars K is forced inwardly, the whole being constructed to be operated from the exterior of the heating chamber to open or close the bottles.

The closure shown in Fig. 4, consists of a rubber stopper a fitted tightly to the neck of the bottle, and in the longitudinal bore c of which is fitted to turn a glass plug b made slightly taper while its upper end is squared to fit sockets in the links n of the parallel movement m n. In the stopper a is formed a radial channel d, and on the periphery of plug b is formed a groove e, so that when the plug is turned to connect the channel and groove the closure is open and vice versa.

In practice the method is carried out as follows:—The bottles filled with milk or other liquid to be sterilized and provided with the closures such as described are secured in the rack F, care being taken that the horizontal channels d in the plugs b all point in the same definite direction. The rack with the open bottles is now slid into the heating chamber and the chamber closed air tight. Steam is now admitted and the bottles exposed for the proper time. The bottles are then simultaneously closed air tight, and then removed from the chamber and permitted to cool. After cooling, the rack containing the bottles is again placed into the heating chamber and the chamber closed and steam admitted. As soon as all the air has been driven out of the steam chamber, so that the bottles are surrounded only by air or vapor free from germs, the bottles are simultaneously opened by pushing in one of the push bars K and the contents of the bottles are again exposed to the steam as before described. The bottles are then closed from the exterior by pushing in the second bar, and are removed after the steam has been shut off and then allowed to cool, when they are ready for shipment.

We have found it to be of great advantage to reduce the steam pressure somewhat after each heating period, then to increase the pressure to the normal one and then to close the bottles. This has the advantage that in view of the reduction of pressure the liquid boils up and is agitated so that all parts are well sterilized and any air and foul gases contained in the liquid escape.

Instead of removing the bottles and cooling the same in the open air, they may be cooled directly in the apparatus by surrounding the same while in the heating chamber with running water entering at Q Q, Fig. 2, and escaping at R, said water being caused to gradually grow colder,—a precaution which must be taken to prevent the bottles from cracking. It is evident that in place of water, hot air or other fluid may be used for sterilizing the liquids, and also that in place of water, air or other fluids may be used for cooling the liquid, and when sterilized air is used for this purpose the bottles need not be closed during the cooling process.

We do not herein claim the apparatus shown as we have claimed the same in an application bearing even date herewith, Serial No. 469,991.

What we claim as new, and desire to secure by Letters Patent, is—

1. The herein described process for the fractional sterilization of liquids in separate receptacles, consisting in placing the receptacles and contents into a heating chamber, heating with the receptacles open, closing the receptacles, then cooling while closed, then re-opening the receptacles while in the heating chamber in the presence of the sterilizing fluid and re-heating; then closing the receptacles while in the chamber and removing the same.

2. The herein described process for the fractional sterilization of liquids in separate receptacles, consisting in placing the receptacles into a suitable chamber and heating while open, then simultaneously closing the receptacles while in the chamber, removing the same when closed and cooling, then replacing in the chamber, then introducing the sterilizing fluid into the chamber, simultaneously opening the receptacles while in the chamber; reheating, and finally simultaneously closing the receptacles again while in the chamber and removing the same, substantially as described.

3. The herein described process for the fractional sterilization of liquids in separate receptacles, consisting in placing the receptacles and contents into a steam chamber, heating with the receptacles open, closing and then cooling, then opening the receptacles while in the chamber in the presence of steam, and reheating with the receptacles open, then reducing the steam pressure in the chamber for the purpose of agitating the liquid, then raising the pressure to the normal, and then closing the receptacles and removing the same.

In testimony whereof we have signed our names to this specification in the presence of two subscribing witnesses.

GEORG POPP.
JOHANN HEINRICH BECKER.

Witnesses:
ALVESTO S. HOGUE,
JEAN GRUND.